United States Patent [19]

Sample

[11] 4,056,008
[45] Nov. 1, 1977

[54] TRANSDUCING METHODS AND TRANSDUCERS

[75] Inventor: Winfield Sample, Sierra Madre, Calif.

[73] Assignee: Bell & Howell Company, Chicago, Ill.

[21] Appl. No.: 700,671

[22] Filed: June 28, 1976

Related U.S. Application Data

[63] Continuation-in-part of Ser. No. 593,395, July 7, 1975, Pat. No. 3,981,198.

[51] Int. Cl.² ........................... G01L 9/02; G01L 7/08
[52] U.S. Cl. .............................. 73/398 AR; 73/407 R
[58] Field of Search ................. 73/407 R, 141 A, 410, 73/398 AR, 406; 338/4, 42, 41, 47, 36

[56] References Cited

U.S. PATENT DOCUMENTS

| 3,695,096 | 10/1972 | Kutsay | 73/141 A |
| 3,795,140 | 3/1974 | Nishihara | 73/141 A |

*Primary Examiner*—Donald O. Woodiel
*Attorney, Agent, or Firm*—Benoit Law Corporation

[57] ABSTRACT

A fluid pressure transducer comprises a housing having a fluid chamber bounded by a diaphragm. A strain gage transducer signal generating device is located in that fluid chamber. This signal generating device is protected from the effects of the fluid in the fluid chamber by a laterally flexible tubular enclosure having two opposite ends which are maintained relatively stationary. The diaphragm is coupled to the tubular enclosure between the opposite ends for laterally flexing the tubular enclosure. The strain gage transducer signal generating device is bonded to an inner wall surface of the tubular enclosure for measurement of the strain of a wall portion of the tubular enclosure during flexing.

4 Claims, 1 Drawing Figure

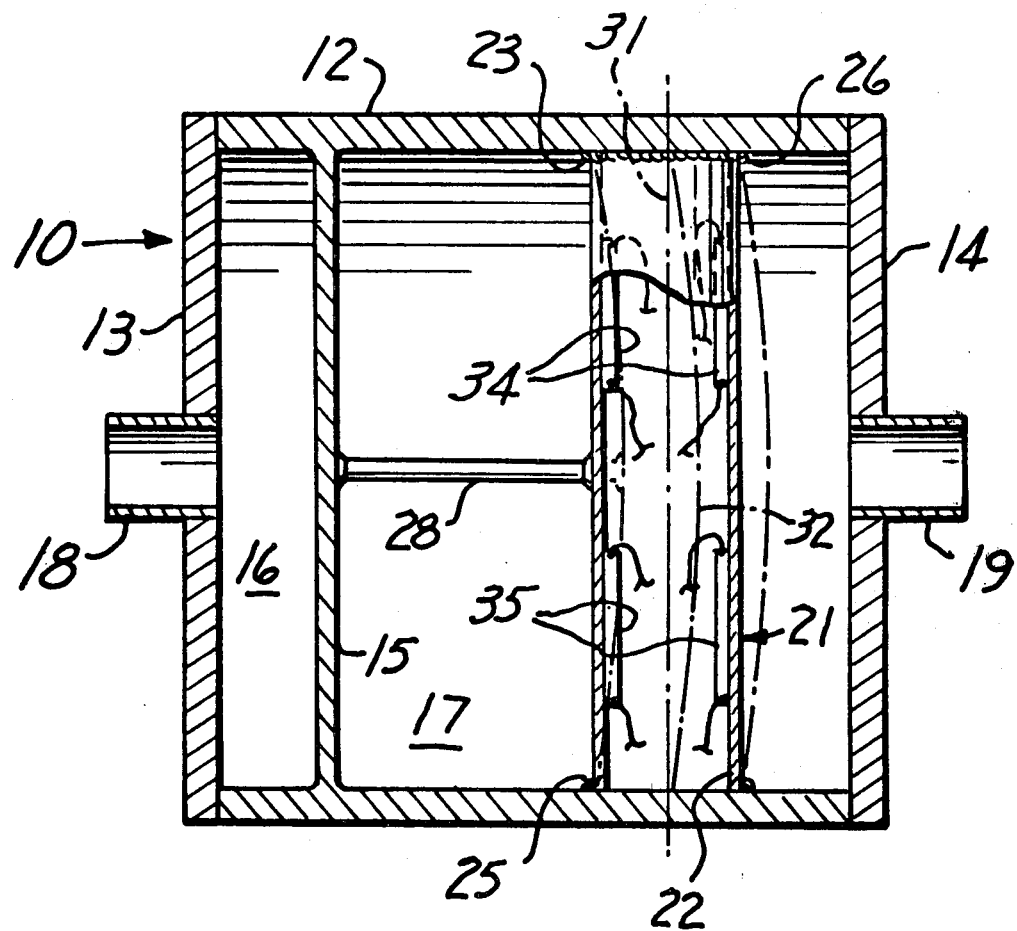

4,056,008

TRANSDUCING METHODS AND TRANSDUCERS

CROSS-REFERENCE

This is a continuation-in-part of patent application Ser. No. 593,395, filed July 7, 1975, now U.S. Pat. No. 3,981,198, by the subject inventor, assigned to the same assignee, and herewith incorporated by reference herein. This application is filed as a result of a requirement for restriction as contemplated by 35 USC 121.

BACKGROUND OF THE INVENTION

1. Field of the Invention

The subject invention relates to liquid or fluid pressure transducers, including differential pressure transducers, and to other apparatus and devices, as well as to methods, for providing a signal in response to a force producing physical condition.

2. Description of the Prior Art

In the case of fluid pressure transducers there exists the problem that the transducing devices for generating an electric or other pressure signal, are often attacked or rendered useless by the fluid applied to the transducer. This tendency is particularly strong when the applied fluid is of a corrosive type. This problem is aggravated in the case of differential pressure transducers, where typically two fluids are applied to the transducer. Under those circumstances, and especially in the case of corrosive fluids, emersion of the transducing elements into either fluid will rapidly impair or destroy the transducing function. Some prior-art designs have attempted to solve this problem by providing a separate diaphragm for each fluid emitted to the transducer, and by arranging the transducing elements in the space between the two diaphragms. In those designs, the diaphragms were supposed to shield the transducing elements from the fluids applied to the transducer.

Proposals of the latter type are encumbered by several disadvantages, which includes the fact that an involvement of more than one diaphragm will not only cause significantly higher expenses and bulkier designs, but will also introduce different diaphragm characteristics and similar mechanical and physical problems into the transducing function.

Against this background, two kinds of prior-art proposals for separating the transducing elements from the remainder of the transducer with the aid of bellows or similar flexible tubing can be discerned. In both kinds of proposals, a bellows structure is relatively stationarily mounted at one end and has a free opposite end.

In one kind of these proposals, the bellows structure is designed and arranged for depression of the free end toward the relatively stationary end in an axial or longitudinal direction through the bellows structure. This kind of design may, for instance, be seen from U.S. Pat. Nos. 2,867,115, 2,956,252, 3,020,405, 3,047,022, 3,559,488, 3,660,745, 3,756,085, 3,780,588, and 3,845,348. Application of this principle to a telephone transmitter may be seen from U.S. Pat. No. 2,191,992.

In the other kind of proposal, the free end of the bellows structure is moved laterally of the longitudinal bellows axis as may, for instance, be seen from U.S. Pat. Nos. 3,089,109 and 3,485,104.

In practice, both kinds of proposals are disadvantageous for several reasons, including the fact that the characteristics of the bellows structure with these designs will adversely enter into the transducing function, and the fact that the bellows structure in such designs will be exposed or subjected to axial compression, which will either falsify the transducer output or require special expensive and cumbersome measures for an avoidance or compensation of that deleterious effect.

Another proposal, mentioned here for the sake of completeness, is apparent from U.S. Pat. No. 3,127,571, and provides the transducing elements outside of a flexible tube into which the pressurized fluid is injected. That design is not practically suitable for differential pressure transducer designs and inherently lacks the advantages attainable with a well-defined diaphragm construction.

How little proposals from unrelated fields are able to solve these problems is, for instance, apparent from U.S. Pat. No. 3,695,096 which shows a strain detecting load cell that relies on a shearing stress type of operation which could never be carried out by a fluid pressure actuated diaphragm of a fluid transducer, and from U.S. Pat. No. 3,857,452 which employs a load cell that relies for its operation on the deformation of a heavy bolt-like solid body and is thus similarly deficient for present purposes.

SUMMARY OF THE INVENTION

It is broadly an object of this invention to overcome the above mentioned disadvantages.

It is a related object of this invention to provide improved apparatus for providing a signal in response to a force producing physical condition.

It is a further object of this invention to provide improved differential and other fluid pressure transducers.

It is a similar object of this invention to provide improved signal transducers wherein signal transducing elements are reliably protected against the effects of corrosive or otherwise harmful fluids.

It is a related object of this invention to provide improved signal transducers in which the influence of a transducer enclosure structure on the transducer output is minimized.

Other objects will become apparent in the further course of this disclosure.

From one aspect thereof, the invention resides in a fluid pressure transducer, comprising in combination a housing, means including a diaphragm for defining a fluid chamber in said housing, means connected to said housing for admitting a fluid to said fluid chamber, strain gage transducer signal generating means in said fluid chamber, means for protecting said transducer signal generating means from effects of said fluid, including a laterally flexible tubular enclosure having an inner wall surface and two opposite ends, means connected to said tubular enclosure for mounting said tubular enclosure in said fluid chamber and for maintaining both of said opposite ends relatively stationary, means connected to said diaphragm and to a portion of said tubular enclosure between said opposite ends for laterally flexing said tubular enclosure with a fluid pressure force picked up by said diaphragm; and means for bonding said strain gage transducer signal generating means to said inner wall surface of the tubular enclosure for measurement of the strain of a wall portion of said tubular enclosure at said wall surface during said flexing of the tubular enclosure.

From another aspect thereof, the invention resides in a fluid pressure transducer, comprising in combination a housing, means including a diaphragm for defining a fluid chamber in said housing, means connected to said housing for admitting a fluid to said fluid chamber, strain gage transducer signal generating means in said fluid chamber, means for protecting said transducer signal generating means from effects of said fluid, including a laterally flexible tubular enclosure having an inner wall surface and two opposite ends, and having loci of symmetry extending along a straight line between said opposite ends in a relaxed condition of said tubular enclosure, means connected to said tubular enclosure for mounting said tubular enclosure in said fluid chamber and for maintaining both of said opposite ends relatively stationary, means connected to said diaphragm, and to a portion of said tubular enclosure between said opposite ends for arranging said loci of symmetry along a curved line intersecting said straight line at both of said ends, said arranging means including means for laterally flexing said tubular enclosure with a fluid pressure force picked up by said diaphragm, and means for bonding said strain gage transducer signal generating means to said inner wall surface of the tubular enclosure for measurement of the strain of a wall portion of said tubular enclosure at said wall surface during said flexing of the tubular enclosure.

From another aspect thereof, the invention resides in a differential fluid pressure transducer, comprising in combination a housing, a single diaphragm dividing said housing into two fluid chambers, means connected to said housing for admitting a first fluid to one of said fluid chambers at one side of said single diaphragm, means connected to said housing for admitting a second fluid to the other of said fluid chambers at the other side of said single diaphragm, strain gage transducer signal generating means in said one fluid chamber, means for protecting said transducer signal generating means from effects of said first fluid in said one fluid chamber, including a laterally flexible tubular enclosure having an inner wall surface and two opposite ends, means connected to said tubular enclosure for mounting said tubular enclosure in said one fluid chamber and for maintaining both of said opposite ends relatively stationary, means connected to said diaphragm and to a portion of said tubular enclosure between said opposite ends for laterally flexing said tubular enclosure with a fluid pressure force picked up by said diaphragm, and means for bonding said strain gage transducer signal generating means to said inner wall surface of the tubular enclosure for measurement of the strain of a wall portion of said tubular enclosure at said wall surface during said flexing of the tubular enclosure.

From another aspect thereof, the invention resides in a differential fluid pressure transducer, comprising in combination a housing, a single diaphragm dividing said housing into two fluid chambers, means connected to said housing for admitting a first fluid to one of said fluid chambers at one side of said single diaphragm, means connected to said housing for admitting a second fluid to the other of said fluid chambers at the other side of said single diaphragm, strain gage transducer signal generating means in said one fluid chamber, means for protecting said transducer signal generating means from effects of said first fluid in said one fluid chamber, including a laterally flexible tubular enclosure having an inner wall surface and two opposite ends, and having loci of symmetry extending along a straight line between said opposite ends in a relaxed condition of said tubular enclosure, means connected to said tubular enclosure for mounting said tubular enclosure in said one fluid chamber and for maintaining both of said opposite ends relatively stationary, means connected to said diaphragm and to a portion of said tubular enclosure between said opposite ends for arranging said loci of symmetry along a curved line intersecting said straight line at both of said ends, said arranging means including means for laterally flexing said tubular enclosure with a fluid pressure force picked up by said diaphragm, and means for bonding said strain gage transducer signal generating means to said inner wall surface of the tubular enclosure for measurement of the strain of a wall portion of said tubular enclosure at said wall surface during said flexing of the tubular enclosure.

BRIEF DESCRIPTION OF THE DRAWINGS

The subject invention and its various aspects and objects will become more readily apparent from the following detailed description of preferred embodiments thereof, illustrated by way of example in the following drawings, in which:

The single FIGURE (hereinafter also referred to as FIG. 1) is a section through a differential pressure transducer in accordance with a first preferred embodiment of the subject invention.

DESCRIPTION OF PREFERRED EMBODIMENTS

The differential pressure transducer 10 of the preferred embodiment of the subject invention shown in FIG. 1 has an essentially circular housing equipped with end plates 13 and 14 fastened thereto by conventional screws or other fastening means (not shown) and sealed thereto in a manner conventional with pressure transducers.

The differential pressure transducer herein illustrated includes a single diaphragm 15 dividing the housing 12 into two fluid chambers 16 and 17. This, indeed, presents the presently most preferred embodiment, as a single diaphragm in a differential pressure transducer avoids the many problems incurred in prior-art equipment employing two diaphragms within which the transducing elements are disposed and protected from the fluid environment. It should, however, be understood that the subject invention, in its broad utility, is not restricted to differential pressure transducers.

The end plate 13 carries a first inlet 18 for admitting a first fluid or liquid to the transducer chamber 16 to one side of the diaphragm 15. Similarly, the end plate 14 carries an inlet 19 for admitting a second fluid to the transducer chamber 17 at the other side of the diaphragm 15. In this manner, the single diaphragm 15 is exposed to a differential in pressure between the first and second fluids.

The pressure transducer 10 shown in FIG. 1, as well as the pressure transducers shown in the other drawings, has a laterally flexible tubular enclosure 21 having two opposite ends 22 and 23 and being housed in the enclosure or housing 12 with end plates 13 and 14.

The tubular enclosure 21 is made of a material, is of a design and has a wall thickness so as to be laterally flexible. By way of example, the tubular enclosure 21 may comprise a thin-walled tube of a copper and nickel alloy, such as Monel metal, copper, such as beryllium copper, bronze, such as phosphor bronze, nickel, stainless steel or another flexible material.

Pursuant to the subject invention, both ends 22 and 23 of the tubular enclosure 21 are maintained relatively stationary. In the preferred embodiment shown in FIG. 1, this is accomplished by fastening or attaching the tubular end portions 22 and 23 to the housing 12, such as by means of circular welds 25 and 26. This restrains the tubular enclosure 21 against axial motion or compression in response to fluid pressure or other influences which could falsify the transducer output signal. A rod 28 extends between and is connected to the diaphragm 15 and a portion of the tubular enclosure 21 between the ends 22 and 23 for transmitting the force picked up by the diaphragm 15 in response to the net fluid pressure to the tubular enclosure 21.

In particular, the rod 28 applies the pressure responsive picked-up force to the tubular enclosure 21 between the relatively stationary ends 22 and 23 and laterally flexes the tubular enclosure 21 with that applied force between the relatively stationary ends 22 and 23.

As shown in FIG. 1, the axis of symmetry, or the loci of symmetry along that axis, of the tubular enclosure 21 extend along a straight line 31 between the opposite ends 22 and 23 in a relaxed condition of the tubular enclosure 21. Lateral flexure of the tubular enclosure 21 by the above mentioned picked-up force via the rod 28 causes an arrangement of the loci of symmetry along a curved line 32 intersecting the straight line 31 at both of the ends 22 and 23.

Loosely speaking, one could rephrase the latter statement by saying that the applied picked-up force flexes the tubular enclosure 21 so as to bend its normally straight axis of symmetry 31 in the manner shown at 32.

This is expressed herein by referring to the loci of symmetry, since the geometric concept of "axis of symmetry" is not believed applicable to curved lines.

The force applied to the tubular enclosure 21 is employed to generate inside and during the flexing of the tubular enclosure a signal indicative of the net pressure picked up by the diaphragm 15. Various methods and means for generating this transducer signal are within the broad contemplation of the subject invention.

For example, the transducer output signal may be generated by measuring the flexure of the tubular enclosure 21 and providing a signal corresponding to that measure of flexure or by measuring the strain of a wall portion of the tubular enclosure 21 inside and during the flexure of the tubular enclosure and providing a signal corresponding to that measured strain.

The latter technique is employed in the preferred embodiment shown in FIG. 1. In particular, two pairs of strain gages 34 and 35 are bonded to the inner wall surface of the tubular enclosure 21 between the end portion 22 and the force transmitting rod 28, and between the end portion 23 and that force transmitting rod, respectively. The strain gages 34 and 35 are part of a strain gate measuring system which typically includes a Wheatstone bridge or equivalent equipment (not shown) for generating an electrical signal corresponding to the measured strain.

In this manner, the desired electric signal in response to the force producing physical condition, to which the diaphragm 15 is being exposed, is generated.

In accordance with the principles of the subject invention, the transducer signal generating devices 34 and 35 are well protected by the flexible tubular enclosure from the effects of the fluid environment existing in the transducer chamber 17.

Various modifications and variations will be suggested or rendered apparent by the subject disclosure to those skilled in the art.

I claim:

1. A fluid pressure transducer, comprising in combination:
   a housing;
   means including a diaphragm for defining a fluid chamber in said housing;
   means connected to said housing for admitting a fluid to said fluid chamber;
   strain gage transducer signal generating means in said fluid chamber;
   means for protecting said transducer signal generating means from effects of said fluid, including a laterally flexible tubular enclosure having an inner wall surface and two opposite ends;
   means connected to said tubular enclosure for mounting said tubular enclosure in said fluid chamber and for maintaining both of said opposite ends relatively stationary;
   means connected to said diaphragm and to a portion of said tubular enclosure between said opposite ends for laterally flexing said tubular enclosure with a fluid pressure force picked up by said diaphragm; and
   means for bonding said strain gage transducer signal generating means to said inner wall surface of the tubular enclosure for measurement of the strain of a wall portion of said tubular enclosure at said wall surface during said flexing of the tubular enclosure.

2. A fluid pressure transducer, comprising in combination:
   a housing;
   means including a diaphragm for defining a fluid chamber in said housing;
   means connected to said housing for admitting a fluid to said fluid chamber;
   strain gage transducer signal generating means in said fluid chamber;
   means for protecting said transducer signal generating means from effects of said fluid, including a laterally flexible tubular enclosure having an inner wall surface and two opposite ends, and having loci of symmetry extending along a straight line between said opposite ends in a relaxed condition of said tubular enclosure;
   means connected to said tubular enclosure for mounting said tubular enclosure in said fluid chamber and for maintaining both of said opposite ends relatively stationary;
   means connected to said diaphragm and to a portion of said tubular enclosure between said opposite ends for arranging said loci of symmetry along a curved line intersecting said straight line at both of said ends, said arranging means including means for laterally flexing said tubular enclosure with a fluid pressure force picked up by said diaphragm; and
   means for bonding said strain gage transducer signal generating means to said inner wall surface of the tubular enclosure for measurement of the strain of a wall portion of said tubular enclosure at said wall surface during said flexing of the tubular enclosure.

3. A differential fluid pressure transducer, comprising in combination:
   a housing;
   a single diaphragm dividing said housing into two fluid chambers;
   means connected to said housing for admitting a first fluid to one of said fluid chambers at one side of said single diaphragm;
   means connected to said housing for admitting a second fluid to the other of said fluid chambers at the other side of said single diaphragm;

strain gage transducer signal generating means in said one fluid chamber;

means for protecting said transducer signal generating means from effects of said first fluid in said one fluid chamber, including a laterally flexible tubular enclosure having an inner wall surface and two opposite ends;

means connected to said tubular enclosure for mounting said tubular enclosure in said one fluid chamber and for maintaining both of said opposite ends relatively stationary;

means connected to said diaphragm and to a portion of said tubular enclosure between said opposite ends for laterally flexing said tubular enclosure with a fluid pressure force picked up by said diaphragm; and means for bonding said strain gage transducer signal generating means to said inner wall surface of the tubular enclosure for measurement of the strain of a wall portion of said tubular enclosure at said wall surface during said flexing of the tubular enclosure.

4. A differential fluid pressure transducer, comprising in combination:

a housing;

a single diaphragm dividing said housing into two fluid chambers;

means connected to said housing for admitting a first fluid to one of said fluid chambers at one side of said single diaphragm;

means connected to said housing for admitting a second fluid to the other of said fluid chambers at the other side of said single diaphragm;

strain gage transducer signal generating means in said one fluid chamber;

means for protecting said transducer signal generating means from effects of said first fluid in said one fluid chamber, including a laterally flexible tubular enclosure having an inner wall surface and two opposite ends, and having loci of symmetry extending along a straight line between said opposite ends in a relaxed condition of said tubular enclosure;

means connected to said tubular enclosure for mounting said tubular enclosure in said one fluid chamber and for maintaining both of said opposite ends relatively stationary;

means connected to said diaphragm and to a portion of said tubular enclosure between said opposite ends for arranging said loci of symmetry along a curved line intersecting said straight line at both of said ends, said arranging means including means for laterally flexing said tubular enclosure with a fluid pressure force picked up by said diaphragm; and means for bonding said strain gage transducer signal generating means to said inner wall surface of the tubular enclosure for measurement of the strain of a wall portion of said tubular enclosure at said wall surface during said flexing of the tubular enclosure.

* * * * *